Figure 1:
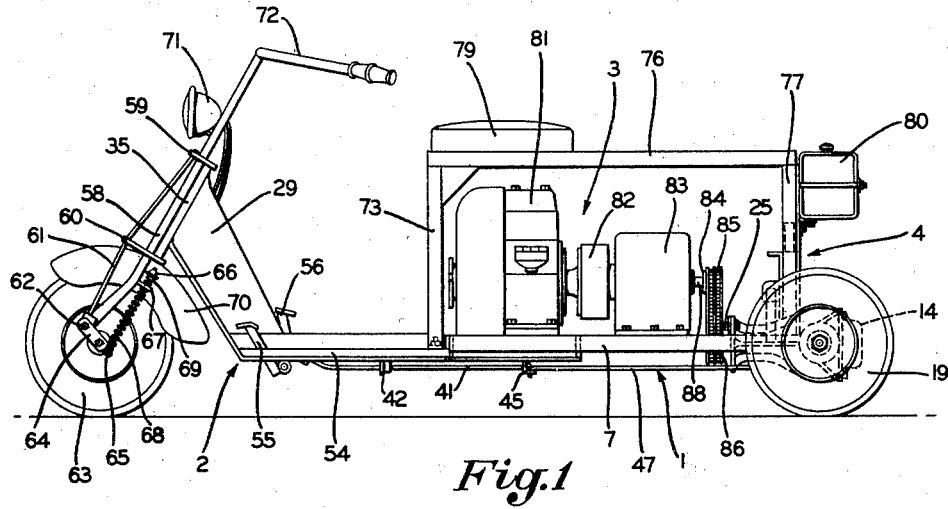

Jan. 7, 1958    H. E. GEISER    2,819,093
SUSPENSION MECHANISM FOR MOTOR DRIVEN VEHICLES AND THE LIKE
Filed Sept. 16, 1954    3 Sheets-Sheet 1

INVENTOR.
Homer E. Geiser
BY Frease & Bishop
ATTORNEYS

Jan. 7, 1958     H. E. GEISER     2,819,093
SUSPENSION MECHANISM FOR MOTOR DRIVEN VEHICLES AND THE LIKE
Filed Sept. 16, 1954     3 Sheets-Sheet 2
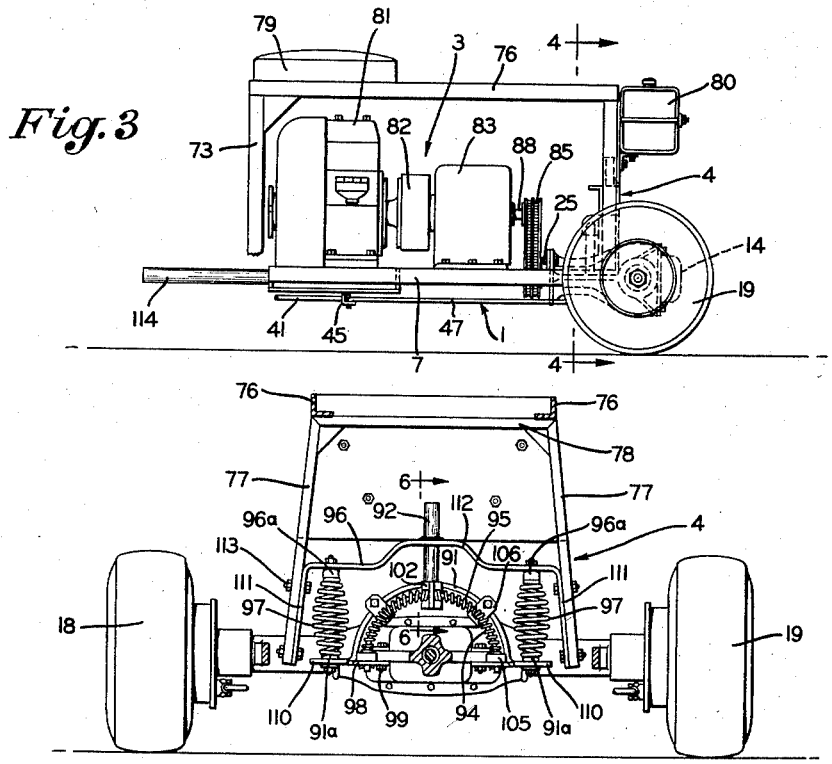
Fig. 3
Fig. 4
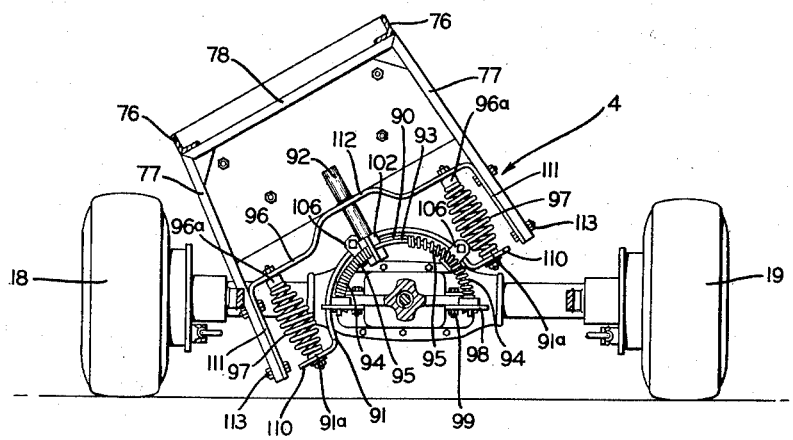
Fig. 5
INVENTOR.
Homer E. Geiser
BY Frease & Bishop
ATTORNEYS Jan. 7, 1958       H. E. GEISER       2,819,093
SUSPENSION MECHANISM FOR MOTOR DRIVEN VEHICLES AND THE LIKE
Filed Sept. 16, 1954                         3 Sheets-Sheet 3

INVENTOR.
Homer E. Geiser
BY Frease & Bishop
ATTORNEYS

United States Patent Office 2,819,093
Patented Jan. 7, 1958

2,819,093

SUSPENSION MECHANISM FOR MOTOR DRIVEN VEHICLES AND THE LIKE

Homer E. Geiser, near Dalton, Ohio

Application September 16, 1954, Serial No. 456,423

17 Claims. (Cl. 280—112)

My invention relates to improvements in vehicle body suspension, and more specifically to a vehicle body suspension which provides a movement of the center of gravity of the vehicle and the operator thereof toward the center of the radius describing the curve around which the vehicle is moving.

Prior body suspensions used on vehicles, such as motor scooters or motor cycles having more than two wheels, have provided for merely vertical movement of the vehicle body and operator in reference to the roadway or path upon which the vehicle is moving. One of the principal difficulties with such prior constructions has been the danger of overturning when it is necessary to pass around sharp curves at high speeds. Such overturning can, of course, cause great bodily injury to the operator of this type of vehicle. A further difficulty with this type of construction is that when a sharp curve is taken, even though the vehicle does not upset due to the centrifugal force exerted on it and the operator, there is danger of the operator being thrown outward away from the vehicle and thereby again causing said operator the danger of serious bodily injury.

It is therefore, a general object of the present invention to provide a vehicle body suspension which eliminates these disadvantages of the prior constructions.

It is a primary object of the present invention to provide a vehicle body suspension in which the center of gravity of the vehicle body and operator is moved towards the center of the radius describing the curve around which the vehicle is passing.

It is a further object of the present invention to provide a vehicle body suspension in which the vehicle body and driver are tilted inwardly towards the center of the radius describing the curve around which the vehicle is passing.

It is still a further object of the present invention to provide a vehicle body suspension in which the centrifugal force of the operator caused by the vehicle passing around a sharp curve is directed partially towards the body and frame of the vehicle giving less tendency to force the operator from the vehicle.

It is another object of the present invention to provide a vehicle body suspension in which power means may be installed to selectively tilt the vehicle body and operator inwardly towards the center of the radius describing the curve around which the vehicle is passing.

Finally it is an object of the present invention to provide a vehicle body suspension which accomplishes all of the above objects in a safe, economical and efficient manner.

These and other objects are accomplished by the parts, constructions, arrangements, combinations and subcombinations comprising the present invention, the nature of which is set forth in the following general statement, preferred embodiments of which—illustrative of the best mode in which applicant has contemplated applying the principles—are set forth in the following description and illustrated in the accompanying drawings, and which are particularly and distinctly pointed out and set forth in the appended claims forming a part hereof.

In general terms, the improved vehicle body suspension comprising the present invention may be stated as including a vehicle body member, a vehicle frame member, and resilient transversely tiltable means connecting the vehicle body to the vehicle frame.

Figure 2:
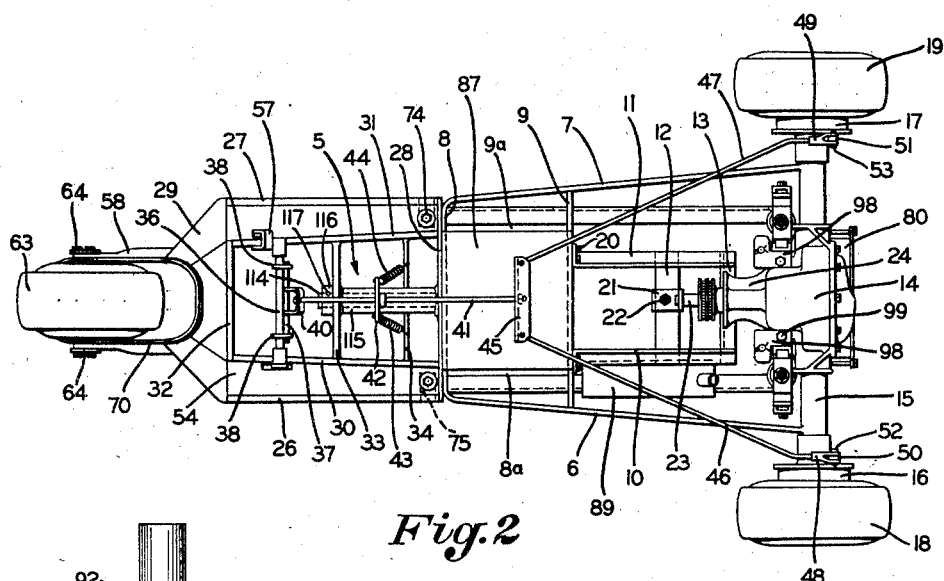
Figure 6:
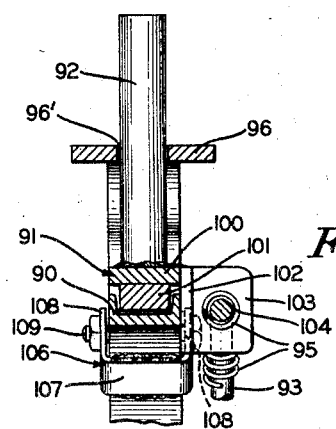
Figure 7:
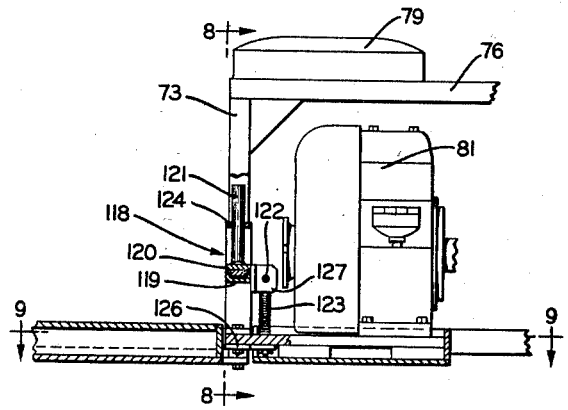
Figure 8:
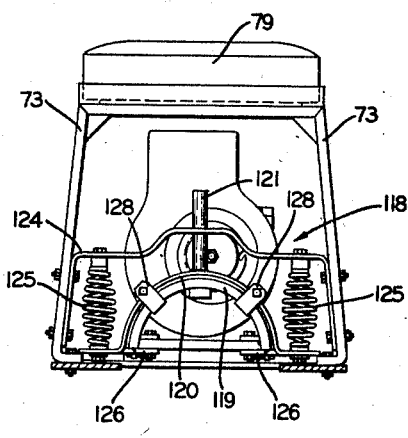
Figure 9:
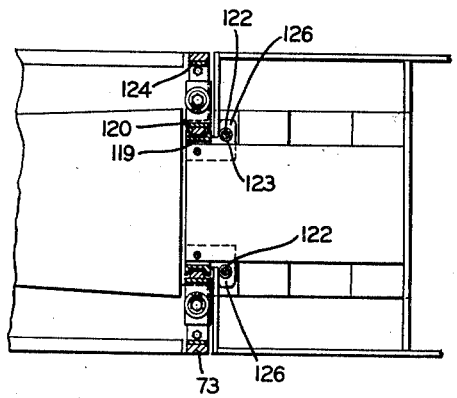
Figure 11:
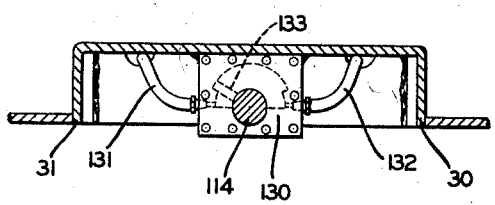
Figure 10:
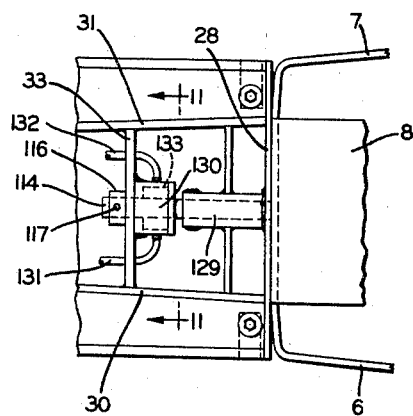

By way of example, embodiments of the improved vehicle body suspension of the present invention are illustrated in the accompanying drawings forming a part hereof, wherein like numerals indicate similar parts throughout the several views, and in which:

Fig. 1 is a side elevation of a three wheeled vehicle including the vehicle body suspension of the present invention;

Fig. 2, a bottom plan view of the vehicle illustrated in Fig. 1;

Fig. 3, a fragmentary side elevation showing the rear portion of the vehicle illustrated in Fig. 1;

Fig. 4, a transverse view, part in section and part in elevation, looking in the direction of the arrows 4—4 in Fig. 3;

Fig. 5, a similar view to Fig. 4 but with the vehicle body tilted in reference to the vehicle frame;

Fig. 6, a fragmentary side view, part in section and part in elevation, looking in the direction of the arrows 6—6 in Fig. 4;

Fig. 7, a fragmentary side view, part in section and part in elevation, illustrating a second embodiment of the present invention;

Fig. 8, a transverse front view, part in section and part in elevation, looking in the direction of the arrows 8—8 in Fig. 7;

Fig. 9, a fragmentary top view, part in section and part in elevation, looking in the direction of the arrows 9—9 in Fig. 7;

Fig. 10, a fragmentary bottom view illustrating a third embodiment of the present invention; and Fig. 11, a fragmentary rear view, part in section and part in elevation, looking in the direction of the arrows 11—11 in Fig. 10.

The vehicle including the vehicle body suspension comprising the present invention includes a frame member generally indicated at 1, a body member generally indicated at 2, a driving member generally indicated at 3, a resilient rear suspension member generally indicated at 4 and a front telescoping member generally indicated at 5. The vehicle illustrated in the drawings, having the vehicle body suspension of the present invention incorporated therein, is generally of a usual type motor scooter having a single front wheel and two rear wheels with the front wheel being used for steering the vehicle.

It should be understood that the general construction of the motor scooter shown is not claimed as part of the invention, but only the unique body suspension means used to connect the frame member 1 and the body member 2, and also the necessary changes in the brake system and the driving system of the vehicle required by the incorporation of such a suspension means.

Referring to Figs. 1 and 2, the frame member generally indicated at 1, includes a pair of main longitudinally extending outwardly angled frame members 6 and 7, a main transverse front frame member 8, a main transverse intermediate frame member 9, a pair of secondary longitudinal motor supporting members 8a and 9a, a pair of secondary longitudinally extending differential supporting frame members 10 and 11, secondary transverse differential supporting frame members 12 and 13, a differential 14, an axle housing 15, brake drums 16 and 17, and rear wheels 18 and 19.

As best seen in Fig. 2, the main longitudinally extending frame members 6 and 7 extend from the front of the frame member 1 rearwardly in a generally horizontal plane and are angled slightly outwardly in reference to each other. Members 6 and 7 are solidly connected at their rearmost ends to the axle housing 15 by preferably welding or any other usual attaching means.

The forwardmost ends of members 6 and 7 are spaced from each other a distance equal to the width of the vehicle at that point, with these ends being joined by the main transverse front frame member 8. It is preferable that the members 6, 7 and 8 be of one continuous piece of bar steel as shown, but it is obvious that they can be separate members connected to each other by means of welding or other usual attaching means.

The main transverse intermediate frame member 9 is mounted abutting the inner sides of the longitudinal frame members 6 and 7 and is spaced rearwardly from the transverse frame member 8 as shown. The two secondary longitudinally extending motor supporting members 8a and 9a are connected to the transverse members 8 and 9 and are parallel to each other and spaced inwardly from the longitudinally extending memberes 6 and 7.

The two secondary longitudinally extending differential supporting frame members 10 and 11 are connected at their forwardmost ends to the intermediate transverse member 9 by preferably bolts 20. Frame members 10 and 11 are spaced inwardly from the main longitudinal frame members 6 and 7 and are parallel to each other terminating rearwardly a distance forward from the axle housing 15 and in lateral alignment with the front portion of the differential 14.

The secondary transverse differential supporting frame members 12 and 13 are mounted on the top side of the longitudinal members 10 and 11 with the transverse member 12 connected to the longitudinal members 10 and 11 spaced from the rearmost ends of the members 10 and 11 and spanning the distance therebetween. The transverse member 13 is connected to the rearmost ends of the longitudinal members 10 and 11 also spanning the distance between these two members. The L-shaped bracket 21 is fastened to the underside of the transverse frame member 12 by preferably the bolt 22 intermediate the length of the transverse member 12 and extending downwardly.

The forwardmost end of the differential shaft 23 is rotatably mounted in the L-shaped bracket 21 and the forward portion of the differential housing 24 is mounted to the transverse frame member 13 by preferably bolts 25 as shown in Fig. 1. The various longitudinal and transverse frame members are preferably either flat bar steel, strip steel or angle members as shown and as is appropriate for the particular desired mounting and connections.

The axle housing 15 is of a usual type and extends from either side of the differential 14 transversely outwardly to and slightly beyond its point of connection to the longitudinal frame members 6 and 7, at which point the rear wheels 18 and 19 are connected to the axle (not shown) encased in the axle housing 15. Wheels 18 and 19 are of any usual preferably rubber tired type and include the usual brake drums 16 and 17 containing the usual and standard mechanical brake mechanisms (not shown).

The body member 2 includes a pair of main longitudinally extending members 26 and 27, a main transverse member 28, a turning hinge member 29, a pair of secondary longitudinally extending members 30 and 31 and the secondary transverse members 32, 33 and 34. The main longitudinally extending members 26 and 27 are parallel and spaced from each other forming the outer edges of the body member 2. The main transverse member 28 connects the rearmost ends of the longitudinal members 26 and 27 with the transverse member 28 spanning the distance therebetween.

Turning hinge member 29 is connected to the forwardmost ends of longitudinal members 26 and 27 and also spans the distance therebetween. Turning hinge member 29 is of the usual type used on motor scooters and extends angularly upwardly as shown in Fig. 1, having the turning hinge 35 formed at its upper end.

The secondary longitudinally extending members 30 and 31 are mounted angled slightly outwardly from each other in spaced apart relationship with their rearmost ends abutting and connected to the main transverse member 28, spaced inwardly from the outermost ends of member 28. Secondary transverse member 32 is mounted centrally along the rearmost edge of the turning hinge member 29 with the outermost ends of member 32 spaced inwardly from the longitudinal members 26 and 27. The forwardmost ends of longitudinal members 30 and 31 abut and are connected to the transverse member 32 at the outermost ends of member 32 as shown.

Secondary transverse member 33 is spaced rearwardly from the transverse member 32 and is connected to the longitudinal members 30 and 31 spanning the distance therebetween. Secondary transverse member 34 is spaced rearwardly from the transverse member 33 and forwardly from the main transverse member 28, also spanning the distance between longitudinal members 30 and 31. Longitudinally extending and transverse members 26, 27, 28, 30, 31, 32 and 33 are preferably of flat bar steel stock, while the transverse member 34 is preferably merely a steel rod member for a purpose to be hereinafter described.

The transverse brake pivot shaft 36 is rotatably mounted against the lower edges of the longitudinal members 30 and 31 intermediate the transverse members 32 and 33. Pivot shaft 36 extends from the longitudinal member 31, to and slightly beyond the longitudinal member 30, so that one end of the shaft 36 overhangs the outer edge of the member 30.

Transverse brake connecting shaft 37 is mounted parallel to the shaft 36 and spaced slightly above the shaft 36 by means of the connection brackets 38. The U-shaped brake rod connecting bracket 40 is rotatably mounted on the transverse brake connecting shaft 37 midway between the ends of shaft 37. The main longitudinal brake connecting rod 41 is solidly connected to the U-shaped bracket 40, as shown in Fig. 2, and extends rearwardly projecting beyond the transverse member 28 and beneath the frame member 1.

The transverse brake rod support member 42 is solidly connected to the brake connecting rod 41 spaced rearwardly from the transverse member 33 and forwardly from the transverse member 34. Springs 43 and 44 are connected to the outermost ends of the support member 42 and also to the transverse member 34, as shown, thus providing a resilient connection between brake connecting rod 41 and the transverse member 34. Springs 43 and 44 are preferably helical springs, but may be any type of resilient member.

Transverse brake rod connecting member 45 is pivotally mounted on the rearmost end of the brake connecting rod 41 with the outermost ends of brake rod connecting member 45 spaced inwardly from the longitudinally extending motor supporting members 8a and 9a. The secondary longitudinally extending brake connecting rods 46 and 47 are pivotally connected to the outermost ends of transverse brake rod connecting member 45 and are angled outwardly in relation to each other, extending rearwardly adjacent the brake drums 16 and 17.

The brake arm connecting yokes 48 and 49 are solidly mounted on the rearmost ends of the secondary brake connecting rods 46 and 47 with the U-shaped opening of the yokes 48 and 49 opening rearwardly. The brake arms 50 and 51 are pivotally connected to the yokes 48 and 49 by preferably pins 52 and 53.

The body foot plate 54 is affixed to the top edges of the main longitudinally extending members 26 and 27 and extends from the rear edge of the turning hinge member 29 to the main transverse member 28. The brake pedal 55 is connected to the overhanging end of the transverse brake pivot shaft 36 and extends upwardly through the body foot plate 54, as best seen in Figs. 1 and 2.

Thus, when foot pressure is applied to the brake pedal 55, this pressure rotates the brake pivot shaft 36 which causes the brake connecting shaft 37 to move in an arcuate path forwardly. This arcuate movement of the shaft 37 moves the U-shaped bracket 40 forwardly causing the main longitudinal brake connecting rod 41 to move forwardly and, at the same time, moving the transverse support member 42 forwardly extending the springs 43 and 44. The forward movement of the main brake connecting rod 41 causes the transverse brake rod connecting member 45 to move forwardly pulling the secondary longitudinally extending brake connecting rods 46 and 47 forwardly. This exerts forward pressure on the lower ends of the brake arms 50 and 51 causing the brakes to be applied to the rear wheels 18 and 19.

When the foot pressure is released from the brake pedal 55, the springs 43 and 44 retract exerting rearward pressure on the main longitudinal brake connecting rod 41 which, through the various connections before described, causes the brake pedal 55 to return to its original position thereby causing the brake arms 50 and 51 to return to their original positions and release the brakes on the wheels 18 and 19.

Further, since the rearmost end of the main longitudinally extending brake connecting rod 41 is pivotally connected to the transverse brake rod connecting member 45, when the resilient rear suspension member generally indicated at 4 and front telescopic suspension member generally indicated at 5, permit the body member 2 to tilt in relation to the frame member 1, as will be hereinafter described, this tilting action of the body member 2 in reference to the frame member 1 will not affect or deter the above described vehicle braking action. The brake latching pedal 56 and the brake latch 57, as seen in Figs. 1 and 2 respectively, may be used to permanently retain the vehicle braking mechanism in the engaged or braking position in the usual manner of such devices.

The front turning fork 58 is pivotally connected to the turning hinge 35 in any usual and appropriate manner such as by the turning hinge plates 59 and 60 and the turning fork support members 61, with the lower end of the turning support member 61 being attached to the lower end of the front turning fork 58 as indicated at 62.

A single front wheel 63, of preferably rubber tired construction, is rotatably and resiliently mounted to the lower end of the front turning fork 58 also in any usual and appropriate manner such as by means of one end of spirng pivot member 64 being pivotally connected at 62 with the front wheel 63 being rotatably mounted near the other end of the pivot member 64 as shown in Fig. 1.

At the ends of the pivot members 64 opposite their ends that are attached to the front turning fork 58 are the spring lugs 65. The lower ends of the spring rods 66 are attached to the spring lugs 65 with the spring rods 66 being received through the brackets 67 spaced from their upper ends. The cushioning springs 68 and 69 surround the spring rods 66 with the spring 68 positioned below the brackets 67 and the springs 69 positioned above the brackets 67.

Thus, when impact forces are exerted on the front wheel 63, the spring pivot member 64 may pivot around the lower end of the front turning fork 58 at 62 and will compress either the spring 68 or the spring 69. In this way, the usual resilient mounting is provided for the front wheel 63.

The front turning fork 58 is also provided with the usual front fender 70 and accessories such as the light 71. Also the usual handle bars 72 are affixed to the upper end of the front turning fork 58 as shown in Fig. 1.

The front vertical seat supporting members 73 are solidly attached to the rearmost ends of the main longitudinally extending members 26 and 27 by means of the bolts 74 and the lugs 75 as shown in Fig. 2, with the supporting members 73 projecting vertically at slight inward angles in relation to each other. Attached to the upper ends of the vertical members 73 are the horizontal seat supporting members 76.

Horizontal members 76 extend horizontally rearwardly from the vertical members 73 in spaced parallel relationship. The rear vertical seat supporting members 77 are solidly attached to the rearmost ends of the horizontal supporting members 76 and extend downwardly, angled slightly outwardly in relation to each other and terminating horizontally adjacent the differential 14.

The front vertical supporting members 73 the horizontal supporting members 76 and the rear vertical supporting members 77 are retained in transverse spaced apart relationship by the transverse seat supporting members 78, which members 78 are fixedly attached thereto. The seat 79 is mounted on the horizontal supporting members 76 as shown, and the gas tank 80 is mounted on the rear vertical supporting members 77 as shown.

Thus, the body member 2 includes the seat supporting members 73, 76, 77, 78 and the front turning hinge member 29 with the front wheel 63 rotatably attached thereto, all permanently connected and solidly joined by the various longitudinally extending members 26, 27, 30 and 31.

The driving member generally indicated at 3 includes the driving motor 81, the clutch 82, the gear reduction unit 83, the driving sprockets 84, the drive chains 85 and the driven sprockets 86. The driving motor 81 is mounted on a motor mounting plate 87 which motor mounting plate is affixed to the main transverse front frame member 8, the main transverse intermediate member 9 and the secondary longitudinally extending motor supporting members 8a and 9a as shown in Fig. 2.

The driving motor 81 is spaced rearwardly from the front vertical seat supporting members 73 with the top of the motor 81 being spaced vertically below the horizontal seat supporting members 76 providing clearance between the motor 81 and the members 73 and 76. The clutch 82 is mounted on the motor shaft (not shown) and extends rearwardly, with the forward end of the gear reduction unit 83 being connected to the rearmost end of the clutch 82.

The driving sprockets 84 are attached to the reduced speed shaft 88 of the gear reduction unit 83 as shown. The driven sprockets 86 are fixedly mounted on the differential shaft 23 with the drive chains 85 engaged over the driving sprockets 84 and the driven sprockets 86, transmitting rotational motion between the gear reduction unit 83 and the differential 14.

The gear reduction unit 83 is mounted on the secondary longitudinally extending support members 10 and 11. A muffler 89 is also provided for the driving motor 81, which muffler 89 is mounted to the secondary longitudinally extending support member 10 as seen in Fig. 2.

The resilient rear suspension generally indicated at 4 includes a semi-circular transverse frame supporting member 90, a semi-circular transverse body supporting member 91, a stabilizing member 92, a semi-circular spring retaining rod 93, two pairs of tilting springs 94 and 95, a transverse body connecting member 96 and a pair of cushioning springs 97.

The semi-circular transverse frame supporting member 90 is preferably channeled or U-shaped in cross section, as shown in Fig. 6, and extends upwardly in a semi-circular arc over the differential housing 24. Semi-circular supporting member 90 has the lugs 98 permanently affixed to its lower ends preferably by means of welding. The lugs 98 are affixed to the differential housing 24 by means of the bolts 99, thereby solidly positioning the member 90 extending vertically upwardly in a semi-circular arc over the differential housing 24. The lugs 98 extend in a horizontal plane forwardly and serve to support and attach the ends of the semi-circular spring retaining rod 93.

The semi-circular transverse body supporting member 91 in cross section, as shown in Fig. 6, preferably includes a rectangular upper semi-circular portion 100 having the same width as the semi-circular frame supporting member 90 and a downwardly projecting rectangular semi-circular portion 101 having a width slightly less than the U-shaped opening formed in the frame supporting member 90. When the semi-circular body supporting member 91 is in proper assembled position, the downwardly projecting portion 101 is received in the U-shaped opening formed in the supporting member 90, as seen in Fig. 6, with the upper semi-circular portion spaced from the U-shaped frame supporting member 90.

A spring stop lug 102 is affixed to the rearmost edge of the body supporting member 91 centrally of the supporting member 91 and extending downwardly adjacent the rearmost edge of the frame supporting member 90. Stop lug 102 has a rearwardly projecting portion 103 having a centrally located hole 104 formed therein.

The semi-circular spring retaining rod 93 is positioned with its ends received in holes formed in the lugs 98 so that the retaining rod 93 is positioned forwardly of and adjacent to the supporting member 90 describing the same arcuate path. The retaining rod 93 is received through the hole 104 in the portion 103 of the stop lug 102 with the tilting springs 95 surrounding the retaining rod 93 and abutting the sides of the portion 103 at their upper ends.

The tilting springs 94 also surround the retaining rod 93 and abut the top edges of blocks 105 which are positioned on the top surface of the lugs 98 as shown in Figs. 4 and 5. The top end of the tilting springs 94 abut the lower ends of the tilting springs 95.

U-shaped retaining members 106 are positioned preferably about one quarter of the length of the supporting members 90 and 91 from the lower ends of these members 90 and 91, with the closed bottom portions 107 affixed to the lower surface of the supporting member 90 and with the leg portions 108 extending upwardly adjacent the sides of the supporting members 90 and 91. Bolts 109 are received through the upper ends of the leg portions 108 with said bolts abutting the upper surface of the supporting member 91.

The lower ends of the semi-circular transverse body supporting member 91 extend horizontally and transversely outwardly to form cushioning spring mounting portions 110 as best seen in Figs. 4 and 5. Cushioning springs 97 are mounted on the top surface of mounting portions 110 and extend vertically upwardly being connected at their upper ends to the transverse body connecting member 96. The ends of the cushioning springs 97 are preferably solidly connected to the mounting portions 110 and the body connecting member 96 and retained in proper assembled position by means of preferably spring connecters 91a and 96a, as shown.

Body connecting member 96, as seen in front elevation in Fig. 4, includes downwardly projecting leg portions 111 and a transversely extending portion 112. The leg portions 111 are solidly connected to the rear vertical supporting members 77 of the body member 2 by preferably the bolts 113.

The stabilizing member 92 is solidly mounted to the top surface of semi-circular transverse body supporting member 91 centrally of body supporting member 91 and extends vertically upwardly and is received through an opening 96' formed in the transverse body connecting member 96, as seen in Figs. 4, 5 and 6. Stabilizing member 92 is preferably cylindrical in configuration and opening 96' is preferably circular, with sufficient clearance therebetween so that stabilizing member 92 may move slidably through the opening 96'. Stabilizing member 92 extends a sufficient distance above transverse member 96 so that any movement between the transverse member 96 and the supporting member 91 will not cause disengagement between the stabilizing member 92 and the transverse member 96.

The front telescoping suspension member, generally indicated at 5, includes a longitudinally projecting frame supporting bar 114, a longitudinally projecting body sleeve member 115 and a retaining collar 116 as seen in Figs. 2 and 3.

The frame supporting bar 114 is solidly mounted centrally of the main transverse front frame member 8 and extends horizontally forwardly having a preferably cylindrical configuration. The body sleeve member 115 is preferably circular tubing and is mounted centrally of and through main transverse member 28 and secondary transverse member 33, spanning the distance therebetween.

Thus, the frame supporting bar 114 may be received telescopically through the body sleeve member 115 until the main transverse front frame member 8 abuts the main transverse body member 28. When so positioned, the frame supporting bar 114 will project forwardly a distance beyond the secondary transverse body member 33 as shown in Fig. 2.

The retaining collar 116 is received over the forwardmost end of the frame supporting bar 114 and is solidly connected to the bar 114 by means of preferably the retaining screw 117. Thus, the retaining collar 116 abuts the forward surface of the secondary transverse body member 33 and retains the frame supporting bar 114 and body sleeve member 115 in telescoped assembly restraining them against longitudinal movement in relation to each other, but allowing rotatable movement therebetween.

Thus, the resilient rear suspension member, generally indicated at 4, and the front telescoping suspension member, generally indicated at 5, allow tilting motion between the frame member 1 and the body member 2. As the body member 2 tilts in reference to the frame member 1, the semi-circular transverse body supporting member 91 slides in an arcuate path over the semi-circular transverse frame supporting member 90, with the U-shaped retaining members 106 allowing such slidable movement, but still retaining these semi-circular members in proper assembled relationship.

As this tilting takes place, the spring stop lug 102, solidly connected to the body supporting member 91, compresses the tilting springs 94 and 95 as shown in Fig. 5. Also, the stabilizing member 92 prevents transverse movement between the supporting member 91 and the transverse body connecting member 96. Further, as this tilting action takes place, the frame supporting bar 114 rotates within the body sleeve member 115 as above described. The cushioning springs 97 merely provide resiliency, and thereby, cushioning between the supporting member 91 and the remainder of the body member 2.

The second embodiment of the present invention illustrated in Figs. 7, 8 and 9 eliminates the front telescoping suspension member, generally indicated at 5, and provides in place thereof, a second resilient suspension member, generally indicated at 118, similar to the resilient rear suspension member, generally indicated at 4, and above described.

The front resilient suspension member 118 also includes a semi-circular transverse frame supporting member 119, a semi-circular transverse body supporting member 120, a stabilizing member 121, a semi-circular spring retaining rod 122, tilting springs 123, a transverse body connecting member 124, a pair of cushioning springs 125, attaching lugs 126, a spring stop lug 127 and U-shaped retaining members 128. All of these similar elements are mounted in the same assembly in the front resilient suspension member 118 as in the rear resilient suspension member 4, and thereby, slidable movement is permitted between the semi-circular frame supporting members 119 and 120.

Transverse body connecting member 124 is mounted in a similar manner to the front vertical seat supporting members 73, with the cushioning springs 125 mounted between the transverse body member 124 and the semi-circular body supporting member 120, and with the stabilizing member 121 received centrally through the body member 124. The semi-circular frame supporting member 119 is again solidly connected to the frame member 1 by the attaching lugs 126, as shown.

Thus, in the second embodiment of the present invention, the frame member 1 and the body member 2 are resiliently connected as well as tiltably connected to each other at both the front and rear of the frame member 1.

The third embodiment of the present invention is similar to the first embodiment which includes the resilient rear suspension member 4 and the front telescoping suspension member 5. In this case, however, as shown in Figs. 10 and 11, the longitudinally projecting body sleeve member 115 is replaced by a shorter sleeve member 129 which extends only slightly more than midway between the main transverse member 28 and the secondary transverse member 33 as seen in Fig. 10. This sleeve 129 is solidly mounted between the secondary longitudinally extending members 30 and 31 forwardly of the main transverse member 28 by preferably welding it or solidly connecting it to the secondary transverse member 34, thereby supporting the forward portion of the sleeve 129.

Mounted to the rear surface of the secondary transverse member 33 and surrounding the longitudinally projecting frame supporting bar 114, is a rotatably acting cylinder 130. Cylinder 130 may be of any usual type, but is preferably pneumatic or hydraulic having the supply connections 131 and 132 and is connected to the frame supporting bar 114 through a usual rotatably actuated impeller 133. Pressure for cylinder 130 may be supplied by any usual pump connected to the driving motor 81.

Thus, in this case, the frame member 1 and the body member 2 are not only resiliently and tiltably connected, but there is also provided power tilting therebetween. Therefore, if the operator of a vehicle having this third embodiment of the invention provided therein, desires to travel over hilly terrain, he may adjust the body of the vehicle upon which he is seated to any desired tilted relationship with the frame thereof, so that he may for instance, be carried along the side of a hill and still remain in a perfectly vertical position. Additionally, in the case of traveling around curves, he may adjust the tilting between the frame member 1 and the body member 2 to any desired relationship to compensate for any particular conditions present.

In the foregoing is presented three embodiments of the present invention, any one of which provides a vehicle body suspension which may be used in the construction of various types of vehicles, and although the invention is shown and described herein incorporated in the construction of a motor scooter, it should be understood that the principles of the present invention may be used advantageously in many other types of vehicles.

It may be seen that by use of a vehicle incorporating the principles of the present invention, the operator thereof may, by shifting his weight slightly inwardly towards the center of the radius describing the curve in a roadway or path upon which the vehicle is traveling, tilt the vehicle body inwardly towards this center and thereby shift the center of gravity of the vehicle body and operator towards this center minimizing the danger of overturning. Additionally, when the operator and vehicle body are in such tilted position, the weight of the operator will be directed a greater amount towards the vehicle body and frame and, therefore, there will be less tendency or less force exerted to throw the operator outward away from the vehicle.

Additionally, the third embodiment of the present invention provides a means by which the operator may selectively tilt the vehicle body in reference to the vehicle frame, thereby giving complete control of this tilting action while passing around curves or while traveling on hilly terrain. Another feature is that the principles of the present invention not only provide the tilting action between the vehicle body and frame, but while such tilting is taking place, there are still provided cushioning springs to cushion the operator against shocks caused by the wheels passing over uneven surfaces.

In the second embodiment herein described, this cushioning action is increased by the provision of two resilient tilting members rather than the single one shown in the first embodiment. Additionally, in all embodiments pivotal connections are provided in the braking system levers so that complete control is maintained over the brakes at all times. Finally, it may be seen that all of the above advantageous features are obtained in a safe, economical and efficient manner.

In the foregoing description, certain terms have been used for brevity, clearness and understanding, but no unnecessary limitations are to be implied therefrom, because such words are used for descriptive purposes herein, and are intended to be broadly construed.

Moreover, the embodiments of the improved construction illustrated and described herein are by way of example, and the scope of the present invention is not limited to the exact details of the construction shown.

Having now described the invention, the construction, operation and use of preferred embodiments thereof and the advantageous new and useful results obtained thereby, the new and useful construction and reasonable mechanical equivalents thereof, obvious to those skilled in the art, are set forth in the appended claims.

I claim:

1. Vehicle body suspension including a vehicle body member, a vehicle frame member, a first semi-circular transverse support member mounted on the frame member, a second semi-circular transverse support member slidably mounted on the first semi-circular member, tilting spring means connected to the first semi-circular member and second semi-circular member, cushioning spring means connected to the second semi-circular member and the body member, and a stabilizing bar solidly connected to the second semi-circular member and slidably connected to the body member.

2. Vehicle body suspension including a vehicle body member, a vehicle frame member, said frame member having a front portion and rear portion, a first semi-circular transverse support member mounted on the rear portion of the frame member, a second semi-circular transverse support member positioned generally vertically overlying and slidably supported on the first semi-circular member, the second semi-circular member connected to the body member, a third semi-circular transverse support member mounted on the front portion of the frame member, a fourth semi-circular transverse support member positioned generally vertically overlying and slidably supported on the third semi-circular member, and the fourth semi-circular member connected to the body member.

3. Vehicle body suspension including a vehicle body member, a vehicle frame member, said frame member having a front portion and rear portion, a first semi-circular transverse support member mounted on the rear portion of the frame member, a second semi-circular transverse support member slidably mounted on the first semi-circular member, resilient means connected to the first semi-circular member and the second semi-circular member, the second semi-circular member connected to the body member, a third semi-circular transverse support member mounted on the front portion of the frame member, a fourth semi-circular transverse support member slidably mounted on the third semi-circular member, resilient means connected to the third semi-circular member and the fourth semi-circular member, and the fourth semi-circular member connected to the body member.

4. Vehicle body suspension including a vehicle body member, a vehicle frame member, said frame member having a front portion and a rear portion, a first semi-circular transverse support member mounted on the rear portion of the frame member, a second semi-circular transverse support member slidably mounted on the first semi-circular member, resilient means connected to the first semi-circular member and the second semi-circular member, cushioning spring means connected to the second semi-circular member and the body member, a third semi-circular transverse support member mounted on the front portion of the frame member, a fourth semi-circular transverse support member slidably mounted on the third semi-circular member, resilient means connected to the third semi-circular member and the fourth semi-circular member, and cushioning spring means connected to the fourth semi-circular member and the body member.

5. Vehicle body suspension including a vehicle body member, a vehicle frame member, said frame member having a front portion and rear portion, a first semi-circular transverse support member mounted on the rear portion of the frame member, a second semi-circular transverse support member slidably mounted on the first semi-circular member, tilting spring means connected to the first semi-circular member and second semi-circular member, cushioning spring means connected to the second semi-circular member and the body member, a stabilizing bar solidly connected to the second semi-circular member and slidably connected to the body member, a longitudinally extending cylindrical member connected to the front portion of the frame member, a longitudinally extending tubular member having a circular hole formed therein mounted on the body member, and the cylindrical member telescoped within the tubular member.

6. Vehicle body suspension including a vehicle body member, a vehicle frame member, said frame member having a front portion and rear portion, a first semi-circular transverse support member mounted on the rear portion of the frame member, a second semi-circular transverse support member slidably mounted on the first semi-circular member, tilting spring means connected to the first semi-circular member and second semi-circular member, cushioning spring means connected to the second semi-circular member and the body member, a stabilizing bar solidly connected to the second semi-circular member and slidably connected to the body member, a third semi-circular transverse support member mounted on the front portion of the frame member, a fourth semi-circular transverse support member slidably mounted on the third semi-circular member, tilting spring means connected to the third semi-circular member and fourth semi-circular member, cushioning spring means connected to the fourth semi-circular member and the body member, and a stabilizing bar solidly connected to the fourth semi-circular member and slidably connected to the body member.

7. Vehicle body suspension including a vehicle body member, a vehicle frame member, said frame member having a front portion and rear portion, a first semi-circular transverse support member mounted on the rear portion of the frame member, a second semi-circular transverse support member slidably mounted on the first semi-circular member, tilting spring means connected to the first semi-circular member and second semi-circular member, cushioning spring means connected to the second semi-circular member and the body member, a stabilizing bar solidly connected to the second semi-circular member and slidably connected to the body member, a longitudinally extending cylindrical member connected to the front portion of the frame member, a longitudinally extending tubular member having a circular hole formed therein mounted on the body member, the cylindrical member telescoped within the tubular member, and power rotating means mounted on the body member and engaged with the cylindrical member.

8. Vehicle body suspension including a vehicle body member, a vehicle frame member, a first semi-circular transverse support member mounted on the frame member, a second semi-circular transverse support member slidably mounted on the first semi-circular member, resilient tilt-resisting means connected to the first semi-circular member and second semi-circular member, resilient cushioning means connected to the second semi-circular member and the body member, and a stabilizing bar solidly connected to one of said second semi-circular and body members and slidably connected to the other of said members.

9. Vehicle body suspension including a vehicle body member, a vehicle frame member, said frame member having a front portion and rear portion, a first semi-circular transverse support member mounted on the rear portion of the frame member, a second semi-circular transverse support member slidably mounted on the first semi-circular member, the second semi-circular member connected to the body member, transversely pivotal means connecting the body member to the front portion of the frame member, and power rotating means connected to the body and frame members through engagement with a portion of said pivotal means.

10. Vehicle body suspension including a vehicle body member, a vehicle frame member, said frame member having a front portion and rear portion, a first semi-circular transverse support member mounted on the rear portion of the frame member, a second semi-circular transverse support member slidably mounted on the first semi-circular member, the second semi-circular member connected to the body member, transversely pivotal means connecting the body member to the front portion of the frame member, said transversely pivotal means including a longitudinally extending cylindrical member and a longitudinally extending tubular member having a circular hole formed therein, the cylindrical member being telescoped within the tubular member, and power rotating means connected to the body member and frame member through engagement wtih the cylindrical member.

11. Vehicle body suspension including a vehicle body member, a vehicle frame member, a first semi-circular transverse support member mounted on the frame member, a second semi-circular transverse support member positioned generally vertically overlying and slidably supported on the first semi-circular member, stabilizing bar means solidly connected to one of said second semi-circular and body members and slidably connected to the other of said members, and resilient means connected to the second semi-circular member and the body member.

12. Vehicle body suspension including a vehicle body member, a vehicle frame member, said frame member having a front portion and rear portion, a first semi-circular transverse support member mounted on the rear portion of the frame member, a second semi-circular transverse support member positioned generally vertically overlying and slidably supported on the first semi-circular member, the second semicircular member connected to the body member, transversely pivotal means connecting the body member to the front portion of the frame member, and power rotating means connected to the body and frame members through engagement with a portion of said pivotal means.

13. Vehicle body suspension including a vehicle body member, a vehicle frame member, a first semi-circular transverse support member mounted on the frame member, a second semi-circular transverse support member slidably mounted on the first semi-circular member, one of said first and second support members having a generally U-shaped cross section forming a generally U-shaped opening therein and the other of said members having a projecting portion, the projecting portion of said other member slidably received in the U-shaped opening of said one member, and generally U-shaped retaining means affixed to one of said first and second support members and movable transversely in relation to the other of said members retaining said members slidably positioned.

14. Vehicle body suspension including a vehicle frame member, a first semi-circular transverse support member mounted on the frame member, a second semi-circular transverse support member slidably mounted on the first semi-circular member, tilting spring means connected to the first semi-circular member and second semi-circular member, cushioning spring means connected to the second semi-circular member and the body member, and stabilizing means between the second semi-circular member and body member limiting transverse shifting of the body member in reference to the second semi-circular member.

15. Vehicle body suspension including a vehicle body member, a vehicle frame member, a first semi-circular transverse support member, means connecting the first semi-circular transverse support member to the frame member, a second semi-circular transverse support member slidably mounted on the first semi-circular member, tilting spring means connected to the first semi-circular member and second semi-circular member, means connecting the second semi-circular member to the body member, one of said means connecting said semi-circular members to their associated body and frame members including cushioning spring means for absorbing shock between the semi-circular member and its associated member, and said one means connecting also including stabilizing means limiting transverse shifting between the semi-circular member and its associated member.

16. Vehicle body suspension including a vehicle body member, a vehicle frame member, said frame member having a front portion and rear portion, a first semi-circular transverse support member mounted on the rear portion of the frame member, a second semi-circular transverse support member positioned generally vertically overlying and slidably supported on the first semi-circular member, tilting spring means connected to the first semi-circular member and second semi-circular member, cushioning spring means connected to the second semi-circular member and the body member, stabilizing means between the second semi-circular member and body member limiting transverse shifting of the body member in reference to the second semi-circular member, and transversely pivotal means connecting the body member to the front portion of the frame member.

17. Vehicle body suspension including a vehicle body member, a vehicle frame member, said frame member having a front portion and rear portion, a first semi-circular transverse support member, means connecting the first semi-circular transverse support member to the rear portion of the frame member, a second semi-circular transverse support member positioned generally vertically overlying and slidably supported on the first semi-circular member, tilting spring means connected to the first semi-circular member and second semi-circular member, means connecting the second semi-circular member to the body member, one of said means connecting said semi-circular members to their associated body and frame members including cushioning spring means for absorbing shock between the semi-circular member and its associated member, said one means connecting also including stabilizing means limiting transverse shifting between the semi-circular member and its associated member, and transversely pivotal means connecting the body member to the front portion of the frame member.

References Cited in the file of this patent

UNITED STATES PATENTS

| | | |
|---|---|---|
| 880,025 | Herman | Feb. 25, 1908 |
| 1,026,851 | Dearing | May 21, 1912 |
| 1,252,643 | Anderson | Jan. 8, 1918 |
| 1,400,286 | Heller | Dec. 13, 1921 |
| 2,116,027 | Kolbe | May 3, 1938 |
| 2,232,549 | McNamara | Feb. 18, 1941 |
| 2,260,102 | Freret | Oct. 21, 1941 |

FOREIGN PATENTS

| | | |
|---|---|---|
| 612,038 | Germany | Apr. 12, 1935 |
| 467,377 | Great Britain | June 16, 1937 |